United States Patent Office 2,894,822
Patented July 14, 1959

2,894,822

PROCESS FOR THE RECOVERY OF DIBORANE

George E. MacWood, Columbus, Ohio, assignor, by mesne assignments, to Olin Mathieson Chemical Corporation, a corporation of Virginia No Drawing. Application November 2, 1955
Serial No. 544,595

1 Claim. (Cl. 23—204)

This invention relates to a process for purifying diborane. More particularly, it relates to a process for separating diborane from ethane and recovering the diborane in essentially quantitative amounts.

In conventional processes for separating diborane from ethane, diborane-ethane mixtures are treated with pyridine whereby the diborane is complexed while the ethane remains unaffected. The ethane and any excess pyridine is removed by distillation. The diborane is recovered from the pyridine complex by reacting it with boron trifluoride dissolved in 1,4-dioxane. The fraction of the mixture volatile at room temperature is then removed and fractionally condensed at −80° C., the fraction non-condensable at this temperature being diborane.

I have found that this procedure results in the recovery of substantially less than quantitative amounts of diborane from the diborane-ethane mixture. Moreover, I have found that the separation of diborane from diborane-ethane mixtures according to the process of my invention results in the recovery of essentially quantitative amounts of diborane from the diborane-ethane mixture.

In recovering diborane from a diborane-ethane mixture according to the process of my invention, the mixture is contacted with pyridine to produce a complex compound of pyridine and diborane. The ethane is removed from the complex compound by fractional distillation and the complex is reacted with boron trifluoride whereby diborane is freed. The freed diborane containing some boron trifluoride is contacted with liquid 1,4-dioxane to produce a boron trifluoride-1,4-dioxane complex compound. The overhead gaseous stream containing 1,4-dioxane and diborane is then fractionally condensed and the diborane separated from the condensed 1,4-dioxane.

An illustration of the improved process of separating diborane from diborane-ethane mixtures according to my invention is given in the following example:

EXAMPLE I

A 3,000 p.s.i. test steel tank fitted with appropriate valves and gauges and a 300 p.s.i. pressure relief valve served as the reaction vessel. The entire system was evacuated to 0.1 mm. Hg, and 10.66 grams (13.5 mols) of technical pyridine were drawn into the vessel. Any pyridine remaining in the inlet line was forced into the vessel with nitrogen. The vessel was then immersed in ice water and evacuated to the vapor pressure of pyridine.

Diborane (6.75 mols) of 98.53 mol percent purity as determined by the cryoscopic method was then introduced into the vessel at a rate determined by the temperature in the reaction vessel which was not permitted to exceed 70° C. The diborane introduction required approximately 1 hour and no pressure was generated. After cooling to about 20° C., the vessel was evacuated and pumped-on at 0° C. and 0.1 mm. Hg for 48 hours. Approximately 1.5 mol percent of ethane was removed in this manner. The pyridine-diborane complex (melting point 11° C.) was then melted by placing the vessel in a water bath and heating it to about 25° C. Ice was substituted for the water in the bath and boron trifluoride (13.5 mols) was introduced into the reaction vessel, the rate of introduction again being controlled by the temperature which was not permitted to exceed 70° C.

Immediately upon addition of the boron trifluoride, diborane was liberated and the pressure in the reaction vessel rose. When the pressure in the reaction vessel reached 100–150 p.s.i., the introduction of boron trifluoride was interrupted and the reaction vessel was shaken manually until the pressure became constant. This required three or four shakes and was accompanied by a 15 to 20 p.s.i. drop in pressure. Alternately diborane was removed from the reaction vessel and the boron trifluoride introduced until all of the boron trifluoride had been introduced into the reaction vessel.

A total of 216 grams of diborane containing material were collected. The composition of the material as determined from its molecular weight was 90 percent diborane and 10 percent boron trifluoride. The collected material was then passed through 1,4-dioxane to complex the boron trifluoride. The overhead containing diborane and some 1,4-dioxane was passed through a Dry Ice trap to remove the dioxane and the diborane was collected at liquid nitrogen temperature.

Distillation of the diborane through a one meter packed column produced diborane of 99.91 mol percent purity as determined by the cryoscopic method.

A gas diffusion adaptor preferably should be placed at the bottom of the inlet to the reaction vessel. With this addition the entire purification can be carried out with no positive pressure in the system which eliminates the necessity for shaking the reaction vessel to complete the reaction between boron trifluoride and the diborane-pyridine complex. Thus the liberated diborane can be removed from the reaction vessel while the boron trifluoride is being introduced into the reaction vessel.

Table I below represents a summary of the mass spectral data obtained on the samples of diborane described in Example I before and after the purification. A comparison of the relative intensity of the mass 30 peaks in the sample which was only distilled and that which was treated according to the procedure of Example I shows the intensity in the former case to be 12.5 times greater than in the latter. This is approximately the same ratio as the mol fraction of impurities in these two samples as obtained by the cryoscopic method. It also indicates that the principal impurity in the distilled-only diborane was ethane. It suggests also that the intensity of the peak can be used as a semi-quantitative measure of purity, at least as far as ethane is concerned.

*Table I*

| Mass | Intensity (percent of 27 m./e. intensity) | |
|---|---|---|
| | Sample of Diborane Distilled Only | Sample of Diborane After Purification |
| 30 | 1.5 | 0.12 |
| 29 | 1.1 | 0.26 |
| 28 | 5.4 | 4.4 |
| 27 | 100 | 100 |
| 26 | 100 | 100 |
| 25 | 54 | 51 |
| 24 | 92 | 77 |

I claim:
In a process for recovering diborane from a mixture of diborane and ethane in which the mixture is contacted with pyridine to produce a complex compound of pyridine and diborane, the ethane is removed from the complex compound by fractional distillation, and the complex is reacted with boron trifluoride whereby diborane is freed, the improvement which comprises reacting a molten complex of pyridine and diborane with pure gaseous boron trifluoride to produce gaseous diborane containing some boron trifluoride, contacting the freed gaseous diborane containing some boron trifluoride with a material consisting essentially of liquid 1,4-dioxane to produce a boron trifluoride-1,4-dioxane complex compound, fractionally condensing the 1,4-dioxane passing overhead with the diborane and separating the gaseous diborane from the condensed 1,4-dioxane.

References Cited in the file of this patent
UNITED STATES PATENTS

| | | |
|---|---|---|
| 2,400,874 | Burk | May 28, 1946 |
| 2,533,696 | Schaeffer et al. | Dec. 12, 1950 |